(12) United States Patent
Hajduczenia (10) Patent No.: US 9,497,076 B2
(45) Date of Patent: Nov. 15, 2016

(54) DUAL-STACK SUPPORT FOR DEMARC AUTO CONFIGURATION (DAC) MECHANISM IN DOCSIS PROVISIONING OF EPON (DPOE) NETWORK

(71) Applicant: ZTE Portugal-Projectos de Telecomunicações Unipessoal Lda, Lisbon (PT)

(72) Inventor: Marek Hajduczenia, Fiaes (PT)

(73) Assignee: ZTE Portugal-Projectos de Telecomuniçōes Unipessoal Lda, Lisbon (PT)

( * ) Notice: Subject to any disclaimer, the term of this patent is extended or adjusted under 35 U.S.C. 154(b) by 526 days.

(21) Appl. No.: 13/794,561

(22) Filed: Mar. 11, 2013

(65) Prior Publication Data

US 2013/0238770 A1    Sep. 12, 2013

Related U.S. Application Data

(60) Provisional application No. 61/609,846, filed on Mar. 12, 2012.

(51) Int. Cl.
| | | |
|---|---|---|
| *G06F 15/173* | (2006.01) | |
| *G06F 15/177* | (2006.01) | |
| *H04L 12/24* | (2006.01) | |
| *H04L 29/12* | (2006.01) | |

(52) U.S. Cl.
CPC ....... *H04L 41/0803* (2013.01); *H04L 61/2015* (2013.01); *H04L 61/6086* (2013.01)

(58) Field of Classification Search
CPC ......... H04L 61/2015; H04L 61/6059; H04W 80/04
See application file for complete search history.

(56) References Cited

U.S. PATENT DOCUMENTS

| | | | |
|---|---|---|---|
| 8,681,695 B1 * | 3/2014 | Krishnan | 370/328 |
| 8,917,723 B2 | 12/2014 | Zheng et al. | |
| 2011/0208845 A1 * | 8/2011 | Droms et al. | 709/222 |
| 2012/0023207 A1 * | 1/2012 | Gandhewar et al. | 709/221 |

FOREIGN PATENT DOCUMENTS

CN      102088391 A    6/2011

OTHER PUBLICATIONS

Chinese Office Action mailed on Jul. 28, 2015 for Chinese Application No. 201310077770.1, filed Mar. 12, 2013 (5 pages).

* cited by examiner

*Primary Examiner* — Peling Shaw
(74) *Attorney, Agent, or Firm* — Perkins Coie LLP (57) ABSTRACT

Systems, devices and techniques for operating a server in an Ethernet passive optical network (EPON) include receiving a Dynamic Host Configuration Protocol (DHCP) control message from a demarcation device, processing the DHCP control message depending on a target mode of operation, such that when the DHCP control message is inconsistent with the target mode of operation, the DHCP control message is dropped and when the DHCP control message is consistent with the target mode of operation, the DHCP control message is forwarded to the EPON and indicating, to the demarcation device, the target mode of operation by including a Mode Select Option field in a DHCP response message to the demarcation device.

28 Claims, 4 Drawing Sheets

DUAL-STACK SUPPORT FOR DEMARC AUTO CONFIGURATION (DAC) MECHANISM IN DOCSIS PROVISIONING OF EPON (DPOE) NETWORK

CROSS REFERENCE TO RELATED APPLICATIONS

This patent document claims the benefit of priority of U.S. Provisional Patent Application No. 61/609,846, filed on Mar. 12, 2012. The entire content of the before-mentioned patent application is incorporated by reference herein.

TECHNICAL FIELD

This patent document relates to systems, devices and techniques for data communications in Ethernet Passive Optical Network (EPON).

BACKGROUND

Data Over Cable Service Interface Specification (DOCSIS) is a telecommunications standard that permits the addition of high-speed data transfer to an existing Cable TV (CATV) system. DOCSIS is employed by cable television operators to provide data services such as Internet over the hybrid fiber coaxial (HFC) infrastructure. Ethernet Passive Optical Network (EPON) is an optical network architecture based on point to multipoint (P2MP) topology in which a single optical fiber and multiple passive optical splitters are used to provide services from a central office or headend to multiple customer premises. EPON uses a point to point (P2P) Emulation Sublayer to render the P2MP network to appear as a collection of P2P links to the higher protocol layers. A network Operations, Administration and Maintenance (OAM) mechanism is included in EPON to facilitate operations and management of EPON.

DPoE (DOCSIS Provisioning over EPON) uses EPON and a DOCSIS Mediation Layer (DML) solution to provide the translation between the EPON and the DOCSIS back-office systems for provisioning of DOCSIS services.

Certain devices operating in an EPON network may need to operate in either the Internet Protocol Version 4 (IPv4) mode or the Internet Protocol version 6 (IPv6) mode.

Improvements to EPON network operation are desired.

SUMMARY

This patent document provides, among others, systems, devices and techniques for data communications in an Ethernet Passive Optical Network (EPON), and specifically to the support for IPv4, IPv6 and any combination of these on Demarcation devices (DEMARC) connected to DPoE ONUs, making part of DPoE Network infrastructure.

In one aspect, a method of operating a demarcation device in an Ethernet passive optical network (EPON) is disclosed. The method includes receiving a Dynamic Host Configuration Protocol (DHCP) message including a Mode Select Option field indicating a protocol mode of operation and operating the demarcation device, until revocation or reboot, by refraining from generating control messages for a protocol mode not indicated in the Mode Selected Option field.

In another aspect, a disclosed apparatus operable in an Ethernet passive optical network (EPON) includes a receiver that receives a Dynamic Host Configuration Protocol (DHCP) message including a Mode Select Option field indicating a protocol mode of operation and a processor that operates the demarcation device, until revocation or reboot, by refraining from generating control messages for a protocol mode not indicated in the Mode Selected Option field.

In another aspect, a disclosed method of operating a server in an Ethernet passive optical network (EPON) includes receiving a Dynamic Host Configuration Protocol (DHCP) control message from a demarcation device, processing the DHCP control message depending on a target mode of operation, such that when the DHCP control message is inconsistent with the target mode of operation, the DHCP control message is dropped and when the DHCP control message is consistent with the target mode of operation, the DHCP control message is forwarded to the EPON and indicating, to the demarcation device, the target mode of operation by including a Mode Select Option field in a DHCP response message to the demarcation device.

In yet another aspect, a disclosed apparatus for operating a server in an Ethernet passive optical network (EPON) includes a receiver that receives a Dynamic Host Configuration Protocol (DHCP) control message from a demarcation device, a message processor that processes the DHCP control message depending on a target mode of operation, such that when the DHCP control message is inconsistent with the target mode of operation, the DHCP control message is dropped and when the DHCP control message is consistent with the target mode of operation, the DHCP control message is forwarded to the EPON and an indicator that indicates, to the demarcation device, the target mode of operation by including a Mode Select Option field in a DHCP response message to the demarcation device.

This and other aspects and their implementations are described in greater detail in the drawings, the description and the claims.

DETAILED DESCRIPTION

The techniques disclosed in this document are useful, in one aspect, for dual-stack (e.g., IPv4 and IPv6) operation of certain network elements in a EPON network. For example, in some embodiments, a demarcation device in an EPON network may be auto-configured by DOCSIS provisioning for dual-stack support when operating in the EPON network.

The techniques disclosed in this document, in some implementations, are able to overcome the existing limitations in the process of dynamic configuration of dual-stack DEMARC devices. In some implementations, the disclosed techniques are useful to limit the DHCP server load by eliminating certain un-necessary control message transmissions. In one aspect, the disclosed techniques are implemented in some embodiments as a mechanism for the network operator to selectively disable IPv4 or IPv6 DHCP on a DEMARC device to avoid DHCP server overload by unnecessary DHCP requests. In one advantageous aspect, the disclosed technique enable certain implementations to allow for intelligent, selective and gradual transition from IPv4 to IPv6 while minimizing the trunk rolls for deployed dual stack devices and centralizes such transition automation on the network operator side.

Figure 1:
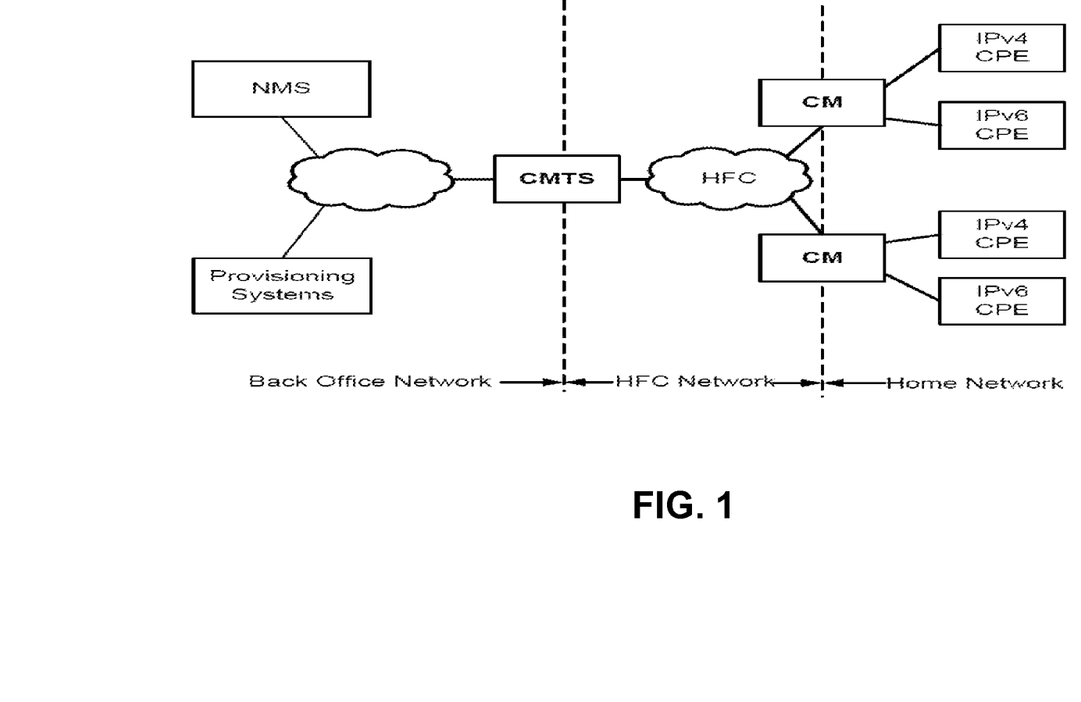
FIG. 1 is a block diagram representation of a data over cable service interface specification (DOCSIS) network.

A DOCSIS architecture is illustrated in FIG. 1 and includes a back-office network with Network Management System (NMS) and provisioning systems, a HFC network and a home network.

A cable modem (CM) is located at a customer premise as a communication interface between the HFC network and one or more customer premise equipment (CPE) devices. The CM connects to the operator's HFC network and to a home network, bridging packets between them. CPE devices can be embedded with the CM in a single device, or an be separate standalone devices as illustrated. Examples of some CPE devices are home routers, set-top devices and personal computers. A cable modem termination system (CMTS) is located at the CATV headend. Cable systems supporting on-demand programming use a hybrid fiber-coaxial system. Fiber optic lines bring digital signals to nodes in the system where they are converted into RF channels and modem signals on coaxial trunk lines. The CMTS connects the operator's back-office and core network with the HFC network. CMTS forwards packets between these two domains, and between upstream and downstream channels on the HFC network.

Figure 2:
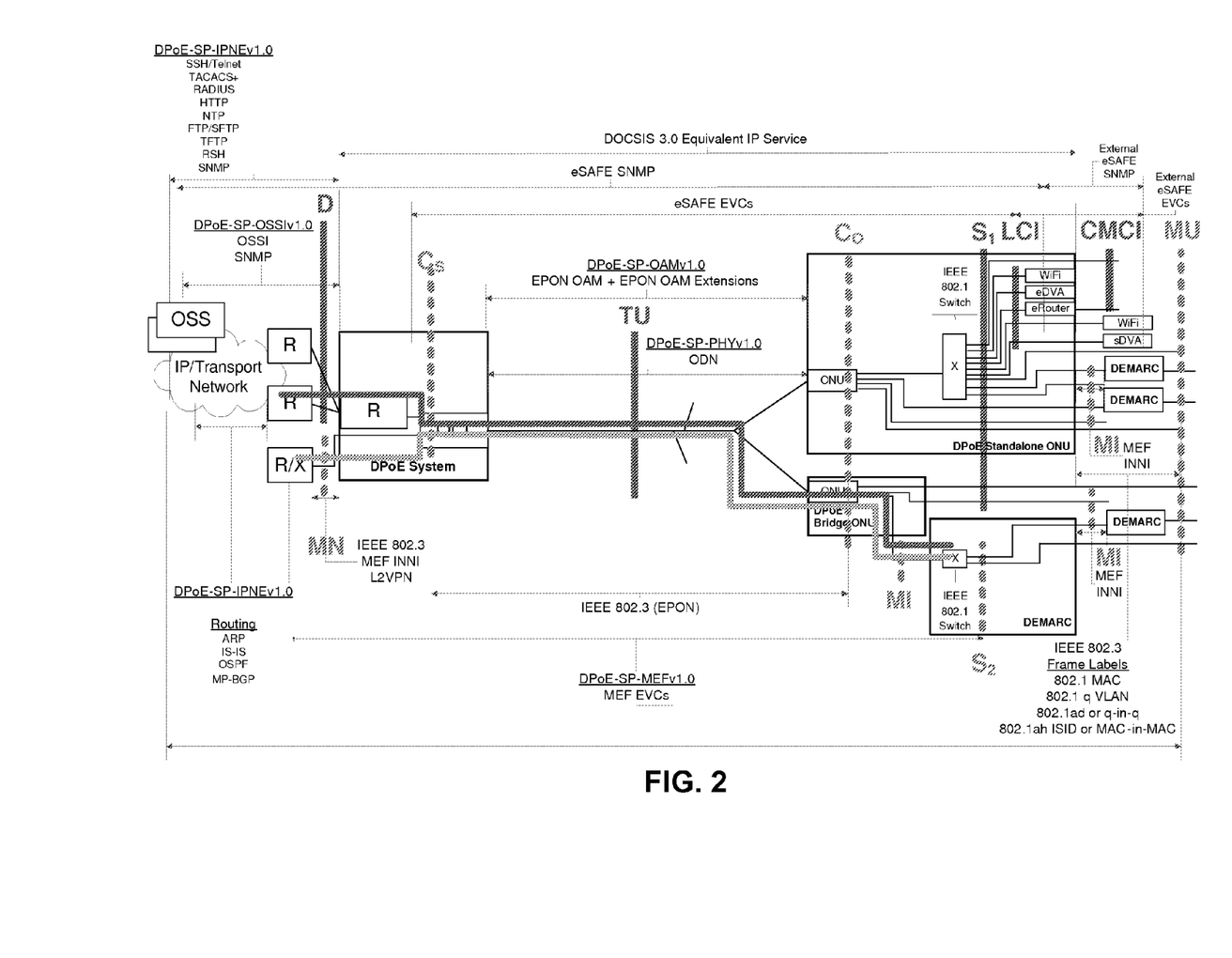
FIG. 2 is a block diagram representation of a DOCSIS passive optical Ethernet (DPoE) network, as shown in CableLabs DPoE specification.

With reference to FIG. 2, DPoE (DOCSIS Provisioning over EPON) uses EPON and a dedicated middleware solution to provide the translation between the EPON and the DOCSIS back-office systems for provisioning of DOCSIS services. Details of this architecture, as well as expected roles and functionalities of specific network elements, e.g., a Demarcation device, one or more DPoE Optical Network Units (ONUs) such as a DPoE Bridge Optical Network Unit (B-ONU), the DPoE System, can be found in the DPoE-SP-ARCH standard, published by CableLabs, incorporated by reference in this document.

This patent document extends the existing techniques published in a draft DPoE Demarcation Device Specification published by Cablelabs, which is incorporated by reference herein, to include dual-stack support for demarcation devices, as further discussed below.

The Demarc Auto Configuration (DAC) mechanism specified as part of a current draft of the DPoE v 1.0 specification set (DPoE-SP-DEMARC I01) defines the behaviour and operational requirements for DPoE System, DPoE ONU(s) and DEMARC devices connected to a DPoE Network in various combinations. Additionally, a number of guidelines associated with the operation of the back office system (OSS), provisioning servers and specifically, DHCP proxies and servers, are made, to facilitate automation of the provisioning processes under the DAC mechanism.

The DPoE-SP-DEMARC I01 specification details the operation of DAC mechanism for DEMARC devices running IPv4 stack only. The said mechanism could be also extended into DEMARC devices running IPv6 stack only.

The one problem currently not addressed in DPoE-SP-DEMARC I01 lies in the operation of DEMARC devices operating with both IPv4 and IPv6 stacks (the so-called dual-stack model), in which the DEMARC device is capable of operating either as an IPv4 or IPv6 device, depending on what type of IP network (supporting either IPv4 or IPv6 version of the Internet Protocol suite) it is connected to.

Techniques are provided in this document that are useful, in one aspect, to extend the DAC mechanism as specified in DPoE-SP-DEMARC I01 for operation with dual-stack DEMARC devices. This document also provides additional features that can be added to certain embodiments of a DPoE System, the OSS and a DEMARC device. In some embodiments, the operation of DPoE ONUs under the extended DAC is unchanged when compared with regular DAC specified in DPoE-SP-DEMARC I01 and detailed discussion is omitted for brevity. Readers are referred to DPoE-SP-DEMARC I01 for details of the DPoE ONU operational features under the DAC mechanism.

Extensions to DAC for Dual-Stack DEMARC Device

Functional features of a DEMARC device that is operable in an EPON network are covered in section 9.1 in DPoE-SP-DEMARC I01. This section provides only extensions to already existing functional requirements for DEMARC device operating under DAC mechanism, while not modifying the overall outline of DAC mechanism operation, as specified in section 8 in DPoE-SP-DEMARC I01.

In some embodiments, a DEMARC device operating in a dual-stack mode goes through the initial power-up and initialization processes per STAGE 1 and STAGE 2 as outlined in section 8 in DPoE-SP-DEMARC I01. During these stages, the DEMARC device discovers the link parameters, type of connected D-ONU device as well as it is configured with all necessary parameters via LLDP extensions detailed in DPoE-SP-DEMARC I01.

In STAGE 3, the dual-stack DEMARC device initiates the DHCP (Dynamic Host Control Protocol) process, under which it is assigned with an IP address and provided with a number of configuration parameters, including Secure Software Download URI Option, providing information on the location, file name and secure file transfer mechanism to be used to securely download the service configuration file from the backoffice server (OSS). At this stage, the dual-stack DEMARC device sends both IPv4 DHCP and IPv6 DHCP address assignment requests (DHCP Discover and DHCP Solicit, respectively), requesting the assignment of respective IP addresses from the north-bound DHCP servers.

The DPoE System per section 9.3 in DPoE-SP-DEMARC I01, is equipped with the DHCP proxy (relay or helper) function, the role of which is limited to the following functions:

In the upstream direction (from the DEMARC device to the DPoE System)
  Intercepting any DHCP control messages originating from the customer-side equipment and transmitted upstream towards the DPoE System.
  Verification whether the said DHCP control messages originates from DEMARC devices or not, optional identification of the type of DEMARC device and deciding which of the special-purpose DHCP servers to relay the said DHCP control messages to.
In the downstream direction (from the DPoE System towards the DEMARC device)
  Intercepting any DHCP control messages originating from the DHCP server and destined to one of the DEMARC devices connected to the DPoE System and making sure that these are forwarded correctly (using proper DAC control data path);
  Verification of the said DHCP control messages for the presence of Secure Software Download URI Option as well as any other DHCP options which are required for the proper operation of DAC and DEMARC devices. These are detailed in DPoE-SP-DEMARC I01.

To facilitate operation of dual-stack, DEMARC devices connected to the DPoE Network are assigned either IPv4 or IPv6 address or alternatively both. The decision on which of the possible addresses is assigned should be at best taken by the operator in a centralized manner without the need to configure the DEMARC devices in any way once they are deployed. This minimizes the number of truck rolls and configuration actions which need to be taken by the operator to guarantee proper operations of the dual-stack DEMARC devices.

To achieve such centralized operator-controlled address assignment behaviour, in some implementations, the following additional functions are performed by the DPoE System and specifically, the DHCP proxy:

The DHCP proxy is be operator-configurable to selectively drop DHCPv4 or DHCPv6 control messages originating from the given DEMARC device. Such a capability should be configurable independently for each DEMARC device connected to the DPoE System. In the default behaviour, the DHCP proxy passes all received DHCP control messages through.

The DHCP proxy is operator-configurable to selectively drop DHCPv4 or DHCPv6 control messages originating from the DHCP server towards the selected DEMARC device. Such a capability should be configurable independently for each DEMARC device connected to the DPoE System. In the default behaviour, the DHCP proxy passes all received DHCP control messages through.

The DHCP proxy is operator-configurable to selectively forward DHCPv4 or DHCPv6 control messages (that have not been dropped) towards selected DHCPv4 or DHCPv6 servers for processing.

The DHCP proxy is able to insert the Mode Select Option into the DHCPv4 Ack/DHCPv6 Reply as well as DHCPv4 Offer/DHCPv6 Advertise messages, instructing the destination DEMARC device on what mode of operation is to be used until the next restart.

In some implementations, an extended DHCP proxy on the DPoE System is therefore configured by an operator to perform a specific set of actions for each incoming DHCP control message originating from a DEMARC device. First, it examines whether the given DEMARC device is configured to operate with an IPv4 or IPv6 address, using information available at the DPoE System and obtained from OSS. Next, it drops or forwards the received DHCP control message, depending on what target mode of operation for the DEMARC device was configured by the operator and what DHCP control message from the DEMARC device was received. Finally, the DHCP proxy inserts the Mode Select Option into the DHCP Offer/DHCP Advertise messages as well as DHCP Ack/DHCP Reply to inform the DEMARC device whether it is expected to operate in IPv4 or IPv6 mode until the next restart/reboot. One example structure of the Mode Select Option is described in this document.

Upon the reception of the DHCP Ack/DHCP Reply together with the Secure Software Download URI Option and the Mode Select Option, the DEMARC device configures its operating mode accordingly. If the Mode Select Option indicates IPv4 mode of operation, the DEMARC device does not generate any additional DHCPv6 control messages until this assignment is revoked or the DEMARC device is restarted/rebooted. Likewise, if the Mode Select Option indicates IPv6 mode of operation, the DEMARC device does not generate any additional DHCPv4 control messages until this assignment is revoked or the DEMARC device is restarted/rebooted. Upon restart/reboot, the dual-stack DEMARC device comes back to the default configuration, under with both the DHCPv4 and DHCPv6 control messages are generated. In this way, the DEMARC device can adapt flexibly to the deployment scenario and can serve its purpose irrespective of the type of IP network it is connected to. It also gives additional advantage to the operator in that once deployed, such a DEMARC device does not need to be overhauled with a truck roll when the IP network is migrated from IPv4 to IPv6.

In one advantageous aspect, because a DEMARC device is configured to operate in a specific mode, unnecessary DHCP control message processing which would have to take place otherwise is avoided. Otherwise, every time a DEMARC device refreshes the allocated IP address, it would send both DHCPv4 and DHCPv6 control messages, unnecessarily loading the OSS DHCP servers.

Moreover, this mode of operation is completely backward compatible with the DAC mechanism as specified in DPoE-SP-DEMARC I01 in that it allows the existing DEMARC devices to operate correctly as long as the extended DHCP proxy function on the DPoE System is configured correctly to pass all DHCP control messages from/to the given DEMARC device through transparently. Also, in this case, the DHCP Mode Select Option is ignored by the DEMARC devices which consider it as an unknown option, resulting in no change in the behaviour of DEMARC devices compliant only to the DPoE-SP-DEMARC I01 spec.

The remaining operating stages of the DAC as specified in DPoE-SP-DEMARC I01 mechanism i.e. STAGE 4, 5, 6, and 7 may remain the same.

In STAGE 5A, the dual-stack DEMARC device restarts operation in the default mode, sending both DHCPv4 and DHCPv6 control messages in STAGE 3, as described before.

Mode Select Option Structure

This TLV carries the DHCP Mode Select Option that is communicated to the DEMARC CPE. The Mode Select Option provides an indication to a DEMARC device in what mode of operation (IPv4, IPv6 or IPv4/IPv6) it is expected to operate following the reception of this option.

In some embodiments, the format of this TLV is defined as follows:

TABLE 1

| 0 1 2 3 4 5 6 7 8 9 10 11 12 13 14 15 | 16 17 18 19 20 21 22 23 24 25 26 27 28 29 30 31 |
|---|---|
| TYPE  LENGTH | VALUE | where
TYPE: identifies the Mode Select Option
LENGTH: identifies the total size of the VALUE field in the Mode Select Option (here, 2 octets)
VALUE: identifies the target model of operation for the given DEMARC device, described in the form of a string. The following values are allowed:
"IPv4" to designate the IPv4 mode of operation
"IPv6" to designate the IPv6 mode of operation
"IPv4/IPv6" to designate the dual stack IPv4 and IPv6 mode of operation
The VALUE field uses a standard ASCII encoded, null-terminated string.

It will be appreciated that the some embodiments implementing the disclosed techniques are useful in allowing a dual-stack operation of a device such as a demarcation device. It will further be appreciated that some embodiments of the disclosed techniques all dual-stack operation of a demarcation device while eliminating un-necessary DHCP message traffic at the same time (e.g., eliminating IPv6 control message traffic when the device is operating as an IPv4 device).

Figure 3:
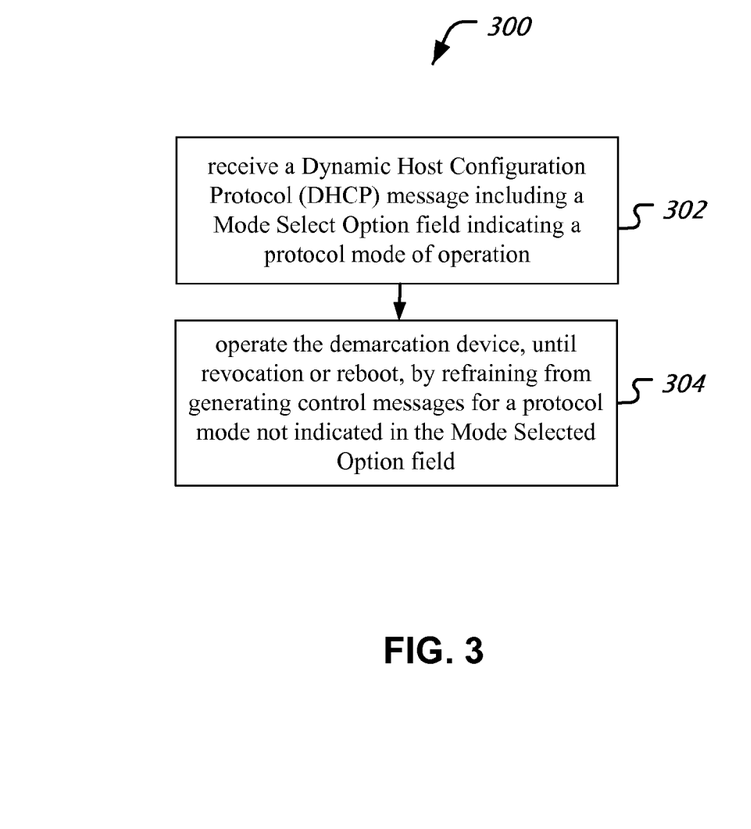
FIG. 3 is a flow chart representation of a process of operating a demarcation device in an Ethernet passive optical network (EPON).

FIG. 3 is a flow chart representation of a method 300 of operating a demarcation device in an Ethernet passive optical network (EPON). At 302, a Dynamic Host Configuration Protocol (DHCP) message including a Mode Select Option field indicating a protocol mode of operation is received. At 304, the demarcation device is operated, until revocation or reboot, by refraining from generating control messages for a protocol mode not indicated in the Mode Selected Option field.

Figure 4:
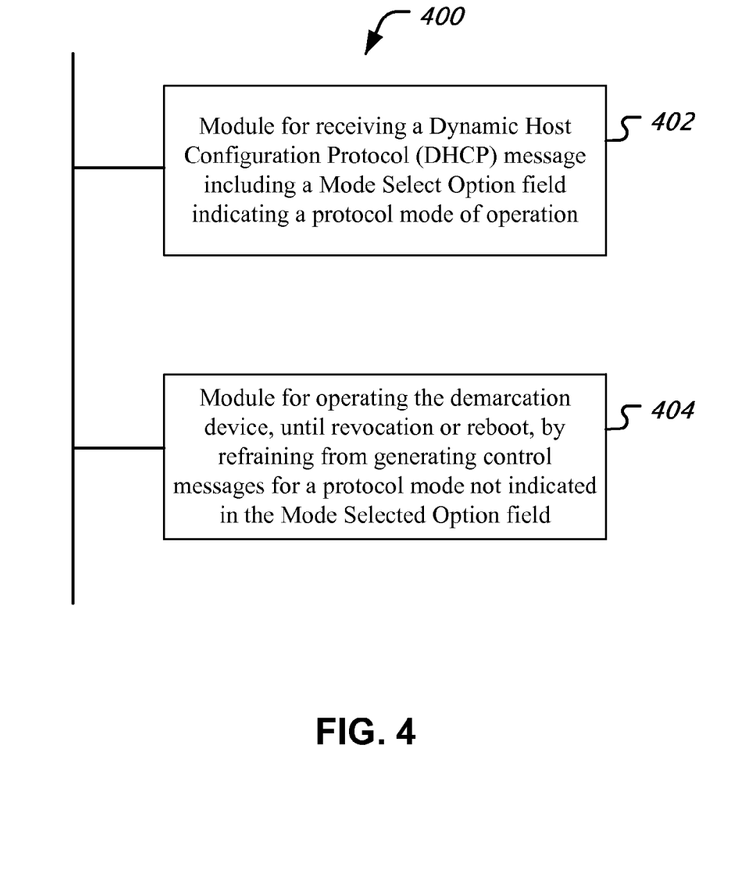
FIG. 4 is a block diagram representation of an apparatus operable in an Ethernet passive optical network (EPON), comprising.

FIG. 4 is a block diagram representation of an apparatus 400 operable in an Ethernet passive optical network (EPON). The module 402 is for receiving a Dynamic Host Configuration Protocol (DHCP) message including a Mode Select Option field indicating a protocol mode of operation. The module 404 is for operating the demarcation device, until revocation or reboot, by refraining from generating control messages for a protocol mode not indicated in the Mode Selected Option field.

Figure 5:
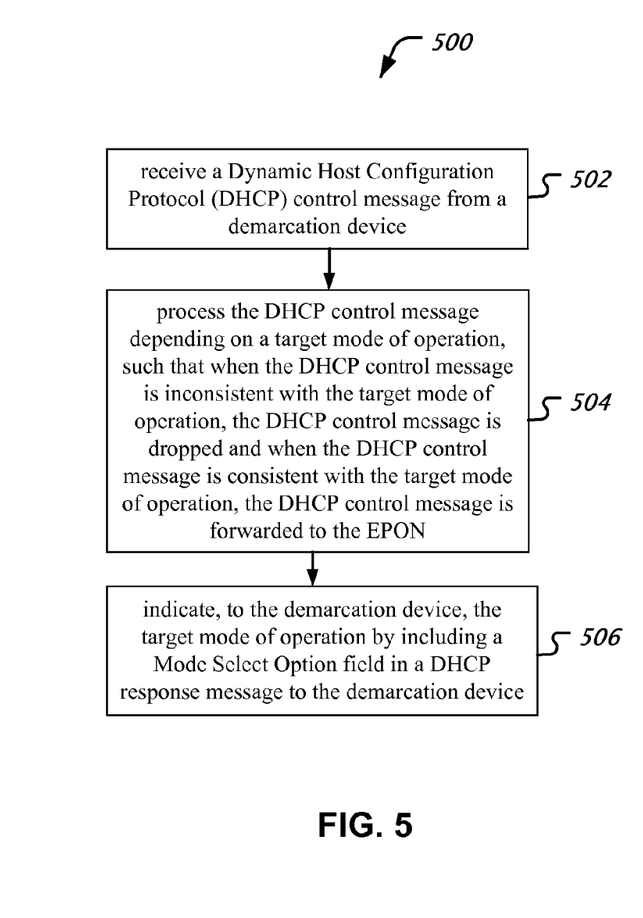
FIG. 5 is a flow chart representation of a process of operating a server in an Ethernet passive optical network (EPON).

FIG. 5 is a flow chart representation of a method 500 of operating a server in an Ethernet passive optical network (EPON). At 502, a Dynamic Host Configuration Protocol (DHCP) control message from a demarcation device is received. At 504, the DHCP control message is processed, depending on a target mode of operation, such that when the DHCP control message is inconsistent with the target mode of operation, the DHCP control message is dropped and when the DHCP control message is consistent with the target mode of operation, the DHCP control message is forwarded to the EPON. At 506, the target mode of operation is indicated to the demarcation device by including a Mode Select Option field in a DHCP response message to the demarcation device.

Figure 6:
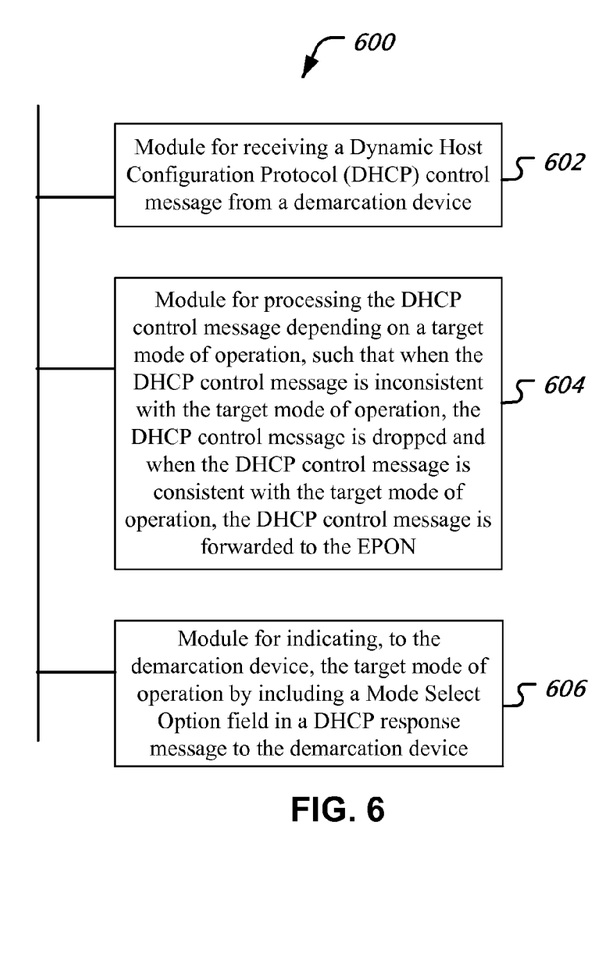
FIG. 6 is a block diagram representation of an apparatus for operating a server in an Ethernet passive optical network (EPON).

FIG. 6 is a block diagram representation of an apparatus 600 operable in an EPON. The module 602 is for receiving a Dynamic Host Configuration Protocol (DHCP) control message from a demarcation device. The module 604 is for processing the DHCP control message depending on a target mode of operation, such that when the DHCP control message is inconsistent with the target mode of operation, the DHCP control message is dropped and when the DHCP control message is consistent with the target mode of operation, the DHCP control message is forwarded to the EPON. The module 606 is for indicating, to the demarcation device, the target mode of operation by including a Mode Select Option field in a DHCP response message to the demarcation device.

It will be appreciated that the disclosed techniques, in some embodiments, are useful in operating a demarcation device and a server in an EPON network such that the server configures the dual-stack operation mode of the demarcation device and the demarcation device, accordingly, either transmits or refrains from transmitting control message. In addition, the server may pass through the control messages consistent with the mode of operation and filter (drop) control messages that are not consistent with the mode of operation of the demarcation device.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of operating a demarcation device in an Ethernet passive optical network (EPON), comprising:
   receiving a Dynamic Host Configuration Protocol (DHCP) message including a Mode Select Option field indicating a protocol mode of operation; and
   operating the demarcation device, until revocation or reboot, by refraining from generating control messages for a protocol mode not indicated in the Mode Selected Option field.

2. The method of claim 1, wherein the Mode Select Option field is configurable to indicate an Internet Protocol version 4 (IPv4) operation, an IP version 6 (IPv6) operation or simultaneous IPv4 and IPv6 operation.

3. The method of claim 1, wherein the DHCP message follows a Type-Length-Value (TLV) format and wherein the Mode Selection option field comprises an ASCII, null-terminated character string value.

4. An apparatus operable in an Ethernet passive optical network (EPON), comprising:
   a receiver that receives a Dynamic Host Configuration Protocol (DHCP) message including a Mode Select Option field indicating a protocol mode of operation; and
   a processor that operates the demarcation device, until revocation or reboot, by refraining from generating control messages for a protocol mode not indicated in the Mode Selected Option field.

5. The apparatus of claim 4, wherein the Mode Select Option field is configurable to indicate an Internet Protocol version 4 (IPv4) operation, an IP version 6 (IPv6) operation or simultaneous IPv4 and IPv6 operation.

6. The apparatus of claim 4, wherein the DHCP message follows a Type-Length-Value (TLV) format and wherein the Mode Selection option field comprises an ASCII, null-terminated character string value.

7. A computer program product comprising a computer-readable medium having code stored thereon, the code, when executed by a computer, causing the computer to implement a method of operating a demarcation device in an Ethernet passive optical network (EPON), the method comprising:
   receiving a Dynamic Host Configuration Protocol (DHCP) message including a Mode Select Option field indicating a protocol mode of operation; and
   operating the demarcation device, until revocation or reboot, by refraining from generating control messages for a protocol mode not indicated in the Mode Selected Option field.

8. The computer program product of claim 7, wherein the Mode Select Option field is configurable to indicate an Internet Protocol version 4 (IPv4) operation, an IP version 6 (IPv6) operation or simultaneous IPv4 and IPv6 operation.

9. The computer program product of claim 7, wherein the DHCP message follows a Type-Length-Value (TLV) format and wherein the Mode Selection option field comprises an ASCII, null-terminated character string value.

10. A demarcation device apparatus operable in an Ethernet passive optical network (EPON), comprising:
    means for receiving a Dynamic Host Configuration Protocol (DHCP) message including a Mode Select Option field indicating a protocol mode of operation; and
    means for operating the demarcation device, until revocation or reboot, by refraining from generating control messages for a protocol mode not indicated in the Mode Selected Option field.

11. The apparatus of claim 10, wherein the Mode Select Option field is configurable to indicate an Internet Protocol version 4 (IPv4) operation, an IP version 6 (IPv6) operation or both simultaneous IPv4 and IPv6 operation.

12. The apparatus of claim 10, wherein the DHCP message follows a Type-Length-Value (TLV) format and wherein the Mode Selection option field comprises an ASCII, null-terminated character string value.

13. A method of operating a server in an Ethernet passive optical network (EPON), comprising:
    receiving a Dynamic Host Configuration Protocol (DHCP) control message from a demarcation device;
    processing the DHCP control message depending on a target mode of operation, such that when the DHCP control message is inconsistent with the target mode of operation, the DHCP control message is dropped and when the DHCP control message is consistent with the target mode of operation, the DHCP control message is forwarded to the EPON; and
    indicating, to the demarcation device, the target mode of operation by including a Mode Select Option field in a DHCP response message to the demarcation device.

14. The method of claim 13, wherein the DHCP response message comprises at least one of a DHCP Offer, a DHCP Advertise, a DHCP Ack and a DHCP Reply messages.

15. The method of claim 13, wherein the target mode of operation comprises an Internet Protocol version 4 (IPv4) operation, an IP version 6 (IPv6) operation or simultaneous IPv4 and IPv6 operation.

16. The method of claim 13, wherein the DHCP response message follows a Type-Length-Value (TLV) format and wherein the Mode Selection option field comprises an ASCII, null-terminated character string value.

17. An apparatus for operating a server in an Ethernet passive optical network (EPON), comprising:

a receiver that receives a Dynamic Host Configuration Protocol (DHCP) control message from a demarcation device;

a message processor that processes the DHCP control message depending on a target mode of operation, such that when the DHCP control message is inconsistent with the target mode of operation, the DHCP control message is dropped and when the DHCP control message is consistent with the target mode of operation, the DHCP control message is forwarded to the EPON; and an indicator that indicates, to the demarcation device, the target mode of operation by including a Mode Select Option field in a DHCP response message to the demarcation device.

18. The apparatus of claim 17, wherein the DHCP response message comprises at least one of a DHCP Offer, a DHCP Advertise, a DHCP Ack and a DHCP Reply messages.

19. The apparatus of claim 17, wherein the target mode of operation comprises an Internet Protocol version 4 (IPv4) operation, an IP version 6 (IPv6) operation or simultaneous IPv4 and IPv6 operation.

20. The apparatus of claim 17, wherein the DHCP response message follows a Type-Length-Value (TLV) format and wherein the Mode Selection option field comprises an ASCII, null-terminated character string value.

21. A computer program product comprising a computer-readable medium having code stored thereon, the code, when executed by a computer, causing the computer to implement a method of operating a server in an Ethernet passive optical network (EPON), the method comprising:

receiving a Dynamic Host Configuration Protocol (DHCP) control message from a demarcation device;

processing the DHCP control message depending on a target mode of operation, such that when the DHCP control message is inconsistent with the target mode of operation, the DHCP control message is dropped and when the DHCP control message is consistent with the target mode of operation, the DHCP control message is forwarded to the EPON; and indicating, to the demarcation device, the target mode of operation by including a Mode Select Option field in a DHCP response message to the demarcation device.

22. The computer program product of claim 21, wherein the DHCP response message comprises at least one of a DHCP Offer, a DHCP Advertise, a DHCP Ack and a DHCP Reply messages.

23. The computer program product of claim 21, wherein the target mode of operation comprises an Internet Protocol version 4 (IPv4) operation, an IP version 6 (IPv6) operation or simultaneous IPv4 and IPv6 operation.

24. The computer program product of claim 21, wherein the DHCP response message follows a Type-Length-Value (TLV) format and wherein the Mode Selection option field comprises an ASCII, null-terminated character string value.

25. An apparatus for operating a server in an Ethernet passive optical network (EPON), comprising:

means for receiving a Dynamic Host Configuration Protocol (DHCP) control message from a demarcation device;

means for processing the DHCP control message depending on a target mode of operation, such that when the DHCP control message is inconsistent with the target mode of operation, the DHCP control message is dropped and when the DHCP control message is consistent with the target mode of operation, the DHCP control message is forwarded to the EPON; and means for indicating, to the demarcation device, the target mode of operation by including a Mode Select Option field in a DHCP response message to the demarcation device.

26. The apparatus of claim 25, wherein the DHCP response message comprises at least one of a DHCP Offer, a DHCP Advertise, a DHCP Ack and a DHCP Reply messages.

27. The apparatus of claim 25, wherein the target mode of operation comprises an Internet Protocol version 4 (IPv4) operation, an IP version 6 (IPv6) operation or simultaneous IPv4 and IPv6 operation.

28. The apparatus of claim 25, wherein the DHCP response message follows a Type-Length-Value (TLV) format and wherein the Mode Selection option field comprises an ASCII, null-terminated character string value.

* * * * *